United States Patent

Matsubara et al.

[11] Patent Number: 5,989,156
[45] Date of Patent: Nov. 23, 1999

[54] SLIP CONTROL SYSTEM FOR LOCK-UP CLUTCH

[75] Inventors: Tooru Matsubara; Kunihiro Iwatsuki, both of Toyota; Hideo Tomomatsu, Nagoya; Hiroji Taniguchi, Okazaki; Kazuyuki Shiiba, Toyota, all of Japan

[73] Assignee: Toyota Jidosha Kabushiki Kaisha, Toyota, Japan

[21] Appl. No.: 08/902,302

[22] Filed: Jul. 29, 1997

[30]     Foreign Application Priority Data

Aug. 1, 1996  [JP]  Japan .................................. 8-219262

[51] Int. Cl.⁶ .......................... F16H 61/14; B60K 41/02; F02D 29/02
[52] U.S. Cl. ........................ 477/169; 477/181; 477/176
[58] Field of Search .................... 477/169, 173, 477/174, 175, 176, 181, 177; 701/67, 68

[56]               References Cited

U.S. PATENT DOCUMENTS

| | | | |
|---|---|---|---|
| 5,105,926 | 4/1992 | Yoshimura et al. | 477/169 |
| 5,283,738 | 2/1994 | Schwab et al. | 701/68 |
| 5,480,363 | 1/1996 | Matsubara et al. | 477/63 |
| 5,547,438 | 8/1996 | Nozaki et al. . | |
| 5,626,536 | 5/1997 | Kono et al. | 477/181 |
| 5,643,136 | 7/1997 | Kono et al. | 477/175 X |
| 5,653,661 | 8/1997 | Kato et al. | 477/176 |
| 5,683,329 | 11/1997 | Kono et al. | 477/176 |
| 5,733,223 | 3/1998 | Matsubara et al. | 477/175 |
| 5,779,595 | 7/1998 | Kono et al. | 477/174 |
| 5,807,204 | 9/1998 | Shiiba et al. . | |
| 5,807,209 | 9/1998 | Matsubara et al. . | |
| 5,816,979 | 10/1998 | Shiiba et al. . | |

FOREIGN PATENT DOCUMENTS

| | | |
|---|---|---|
| 2-142970 | 6/1990 | Japan . |
| 6-127292 | 5/1994 | Japan . |

*Primary Examiner*—Dirk Wright
*Attorney, Agent, or Firm*—Oblon, Spivak, McClelland, Maier & Neustadt, P.C.

[57]               ABSTRACT

A lock-up clutch slip control system for controlling a lock-up clutch, which is arranged in parallel with a hydraulic power transmission for connecting a prime mover and a speed change unit, selectively into a slip state. It is decided whether or not a slip control of changing the lock-up clutch from a complete apply state to a slip state is to be executed according to the operation of lowering the output of the prime mover. The output of said prime mover is changed to suppress the output fluctuation of the prime mover when it is decided that the slip control of the lock-up clutch is to be executed.

11 Claims, 9 Drawing Sheets

SLIP CONTROL SYSTEM FOR LOCK-UP CLUTCH

BACKGROUND OF THE INVENTION

1. Field of the Invention

The present invention relates to a system for controlling a lock-up clutch, which is arranged in parallel with a hydraulic power transmission such as a torque converter, and, more particularly, to a control system for executing a slip control to keep the lock-up clutch in a slip state.

2. Related Art

As well known in the art, the hydraulic power transmission such as the torque converter is inevitably influenced by a relative rotation between its input element and output element so that it causes deterioration in the fuel economy of the vehicle. In recent years, therefore, a lock-up clutch is arranged in parallel with the hydraulic power transmission to connect the input element and the output element directly so that the fuel economy may be improved by applying the lock-up clutch selectively to transmit the torque through the lock-up clutch in place of the hydraulic power transmission.

In short, the lock-up clutch effects a mechanically direct connection between a prime mover such as an engine and a speed change unit. Thus, the lock-up clutch transmits the fluctuation in the output torque of the prime mover as it is to the speed change unit, and may deteriorate the shocks and the booming noises. Considering the driving comfort of the vehicle, therefore, the region where the lock-up clutch can be applied is restricted. If the control is made to apply or release the lock-up clutch completely, on the other hand, the so-called "slip" in the hydraulic power transmission disappears or appears to change the output shaft torque of the vehicle. This torque change is physically felt, if extreme, as the apply shocks to degrade the driving comfort of the vehicle.

In the prior art, therefore, there has been developed a technique, in which the lock-up clutch is not only controlled to apply and release states but also set to have a slightly smaller transmission torque capacity than the input torque so that it may be brought into a slip state (i.e., a partially applied state), as disclosed in Japanese Patent Laid-Open No. 142970/1990 (i.e., JPA2-142970). The invention, as disclosed in this publication, is constructed, as will be specifically described in the following. When the lock-up clutch is to be changed from the release state to the apply state, it is controlled at first into the slip state to reduce the difference between the RPM at the input side and the RPM at the output side gradually, and the lock-up clutch is then controlled into the complete apply state.

In the system of the prior art, as described above, the running state of the vehicle comes into the lock-up region as the vehicle speed rises thereby to control the application of the lock-up clutch. This control is intended to prevent an abrupt change in the rotation, which might otherwise be caused by applying the lock-up clutch, and the shocks which might accompany the abrupt rotational change. When the lock-up clutch is set in the slip state, however, the abrupt torque fluctuation and the vibrations can be cut while the torque being transmitted at a level. Therefore, the slip control can be effectively executed not only as a transient control for applying the lock-up clutch but also in other situations. In these situations, the slip control may desirably be made together with the control of the state such as the input torque of the prime mover. In the prior art, the slip control is made exclusively on the basis of the difference between the input/output RPMs, i.e., the slip percentage so that it is not always proper. This may deteriorate the shocks or the vibrations.

SUMMARY OF THE INVENTION

A main object of the present invention is to provide a control system capable of controlling the change of a lock-up clutch from the so-called "complete lock-up state" to the slip state to a satisfactory extent.

Another object of the present invention is to execute the shift of the lock-up clutch from the complete apply state to the slip state without any response delay.

In the control system of the present invention, the lock-up clutch is controlled to the slip state as the output of the prime mover is lowered with the lock-up clutch being applied. In this shift, the prime mover is controlled to have a stable output and to change the output. If the prime mover is exemplified by an internal combustion engine, the control is to increase the flow of intake air thereby to raise the output. As a result, the internal combustion engine is stabilized in combustion to reduce the output fluctuation. As a result, the fluctuation in the output torque for a transient time period to shift the lock-up clutch to the slip state is reduced to prevent or suppress the shocks. In order to stabilize the internal combustion engine, on the other hand, the fuel cut control may be inhibited.

In the present invention, moreover, a control to raise the output temporarily is executed to stabilize the output of the prime mover. If, therefore, the output of the prime mover at the instant when the slip control of the lock-up clutch is decided is low, the control of increasing the output of the prime mover to stabilize it is inhibited. As a result, the increase in the output is neither executed contrary to the lowering operation of the output nor is physically felt.

In the present invention, moreover, when the lock-up clutch is to be set in the complete apply state, its apply force is set to the minimum level for no slip. This minimum level may be updated by a learning control. As a result, immediately after the decision that the lock-up clutch is to be subjected to the slip control, the lock-up clutch is shifted to the slip control without any response delay. At the instant, therefore, when the output of the prime mover falls to make its torque unstable, it is possible to prevent the shocks or vibrations which might otherwise be caused by the instability of the output of the prime mover because of the slip of the lock-up clutch.

The above and further objects and novel feature of the invention will more fully appear from the following detailed description when the same is read in connection with the accompanying drawings. It is to be expressly understood, however, that the drawings are for purpose of illustration only and are not intend as a definition of the limits of the invention.

DETAILED DESCRIPTION OF THE PREFERRED EMBODIMENT

Figure 6:
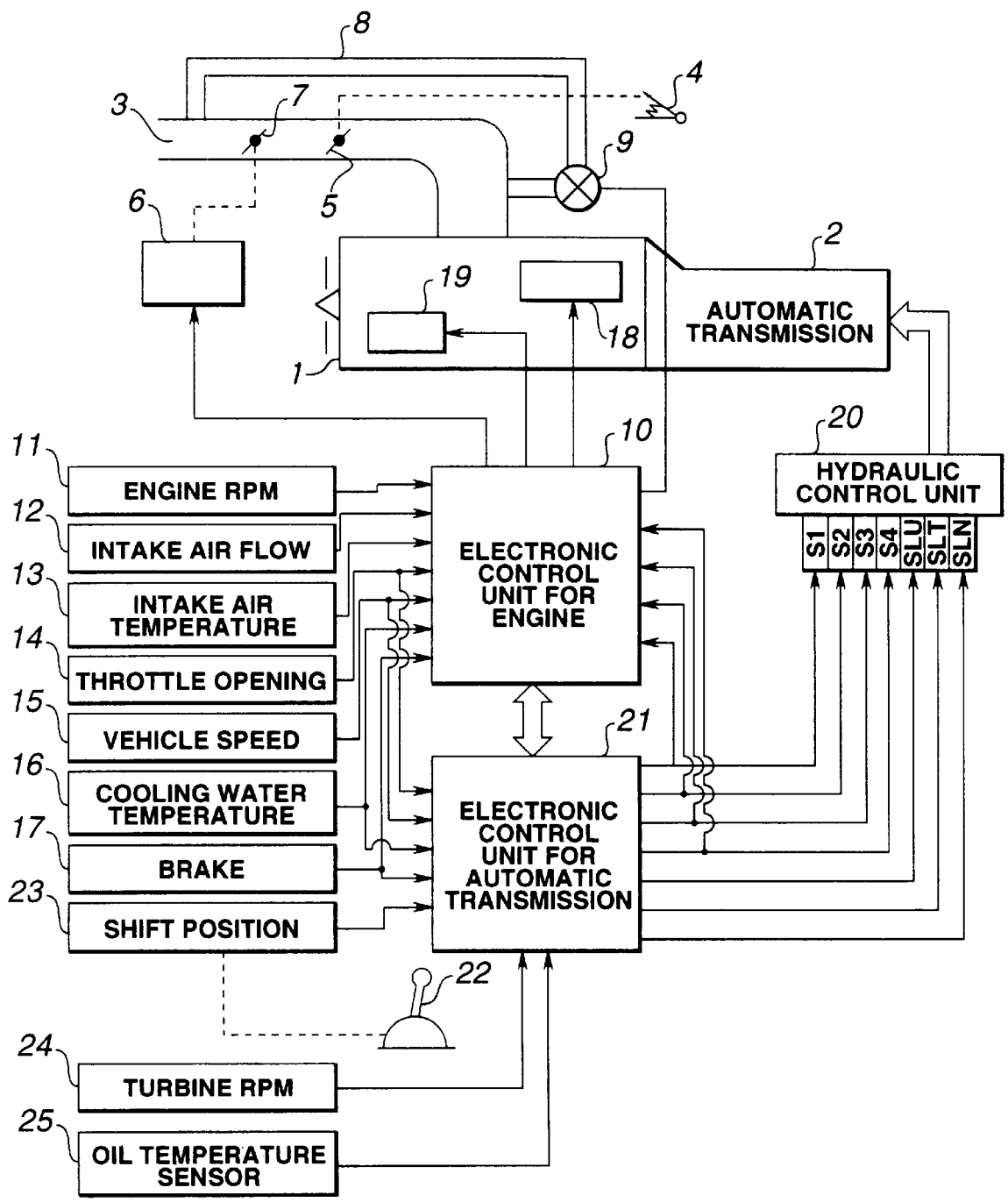
FIG. 6 is a schematic block diagram showing one example of a control system to which is applied the present invention.

The present invention will be specifically described with reference to the accompanying drawings. First of all, here will be briefly described the entire control system of a vehicle, to which is applied the present invention. In FIG. 6, the prime mover is exemplified by an (internal combustion) engine 1, which is connected at its output side to a hydraulically controlled automatic transmission 2. The engine 1 is so controlled that its output can be controlled both manually and electrically. In the intake conduit 3 of the engine 1, there is arranged a main throttle valve 5 which is connected to an accelerator pedal 4 by mechanical means of a cable. In the intake conduit 3 upstream of the main throttle valve 5, there is arranged a sub-throttle valve 7 which is controlled in the degree of its opening by a throttle actuator 6 such as a servo motor. Usually, the sub-throttle valve 7 is set in its fully open state, and the engine output is adjusted as the main throttle valve 5 is changed in the degree of opening according to the depression stroke of the accelerator pedal 4. When the engine output has to be lowered not by the manual operation, the sub-throttle valve 7 is electrically to reduce its opening.

The intake conduit 3 is provided with a bypass conduit 8 for providing communication between upstream of the sub-throttle valve 7 and downstream of the main throttle valve 5. This bypass conduit 8 is equipped therein with an idle speed control valve (i.e., ISC valve) 9 which is electrically adjusted in the degree of opening. These bypass conduit 8 and ISC valve 9 are provided for keeping the idling rotation by sucking a small flow of intake air at the idle ON time when the main throttle valve 5 is fully closed by returning the accelerator pedal 4. The idling RPM is controlled by adjusting the opening of the ISC valve 9 to change the suction at the idling time.

There is provided an electronic control unit 10 for executing the controls of the engine 1, as including the controls of the openings of the ISC valve 9 and the sub-throttle valve 7. This electronic control unit 10 is constructed mainly of a central processing unit (CPU), memory units (RAM and ROM) and an input/output interface. To this electronic control unit 10, there are inputted as control data, in addition to a signal corresponding to the depression stroke of the accelerator pedal 4: the output signal of an engine RPM sensor 11; the output signal of an intake air flow sensor (i.e., an air flow meter) 12; the output signal of an intake air temperature sensor 13; the output signal of a throttle opening sensor 14; the output signal of a vehicle speed sensor 15; the output signal of a cooling water temperature sensor 16; and the output signal of a brake switch 17. On the other hand, this engine electronic control unit 10 is constructed to output signals not only for controlling the throttle actuator 6 but also for controlling a fuel injector 18 and for controlling an igniter 19 for changing the ignition timing to control the torque at a shifting time.

The aforementioned automatic transmission 2 is connected to the engine 1 through a torque converter or a hydraulic power transmission having a built-in lock-up clutch, as will be described hereinafter. There is provided a hydraulic control unit 20 for changing the gear stage of the torque converter and for controlling the lock-up clutch. This hydraulic control unit 20 is composed of: first to third solenoid valves S1 to S3 for setting mainly the gear stages; a fourth solenoid valve S4 for controlling the engine braking state; a linear solenoid valve SLU for controlling mainly the lock-up clutch; a linear solenoid valve SLT for controlling the line pressure in accordance with the throttle opening; and a linear solenoid valve SLN for controlling mainly the back pressure of an accumulator.

There is also provided an electronic control unit 21 for the automatic transmission, for outputting control signals of those individual solenoid valves in the hydraulic control unit 20. This automatic transmission electronic control unit 21 is constructed, like the aforementioned engine electronic control unit 20, mainly of a central processing unit (CPU), memory units (RAM and ROM) and an input/output interface so that it can be integrated/united, if necessary, with the engine electronic control unit 10. This automatic transmission electronic control unit 21 makes calculations on the basis of input data according to prestored maps and/or calculation formulas and outputs control signals, as based on the calculation results, to the aforementioned individual solenoid valves to execute speed changes of four forward and one reverse gear stages, for example, the control for applying/releasing the lock-up clutch and the control of the transient oil pressure at the shifting time.

To the automatic transmission electronic control unit 21, moreover, there are inputted as control data, in addition to the output signals of the throttle opening sensor 14, the vehicle speed sensor 15, the cooling water temperature sensor 16 and the brake switch 17: a signal from a shift position sensor 23 disposed in a shift device 22; a signal from a turbine RPM sensor 24 of the torque converter; and a signal from an oil temperature sensor 25. The individual electronic control units 10 and 21 thus far described are so linked to each other that they can transmit the data, and the automatic transmission electronic control unit 21 transmits signals for setting the individual gear stages to the engine electronic control unit 10.

Figure 7:
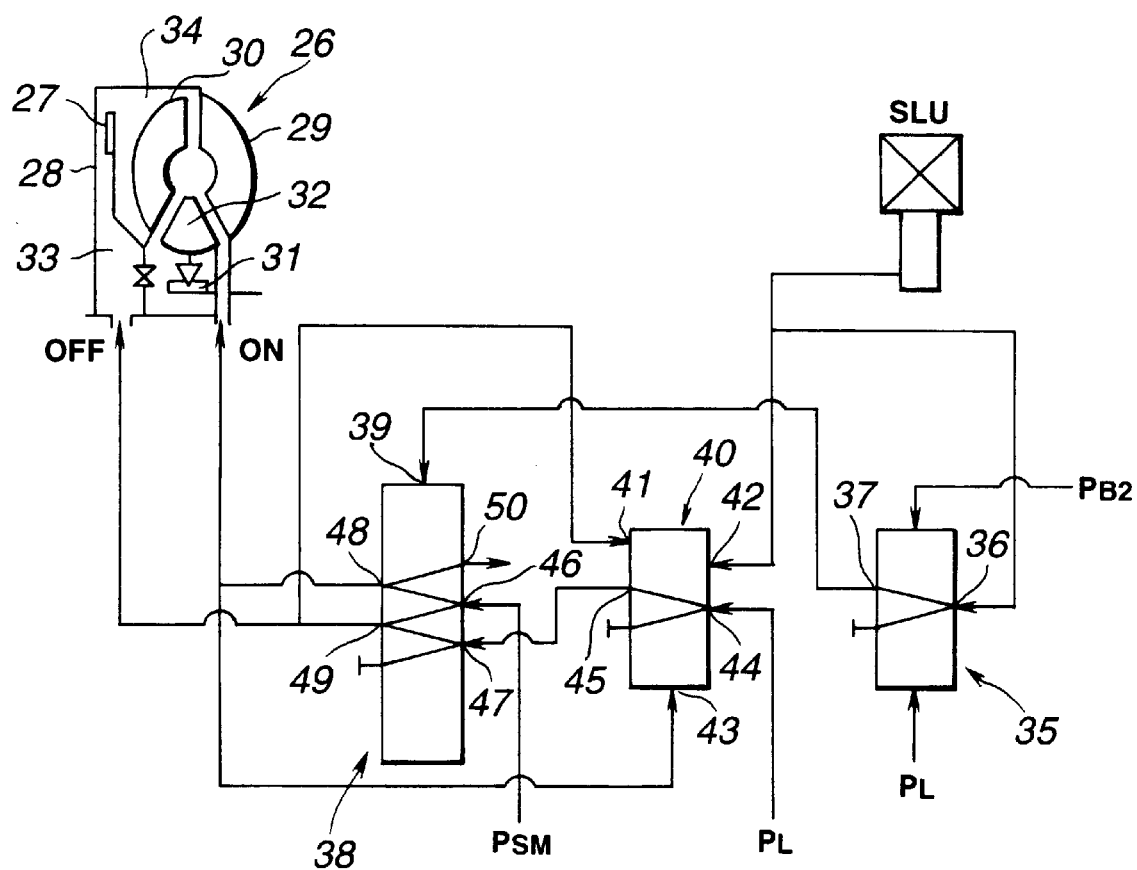
FIG. 7 is a diagram showing a hydraulic circuit for controlling the lock-up clutch of an automatic transmission shown in FIG. 6.

With reference to FIG. 7, here will be described a torque converter 26 corresponding to the hydraulic power transmission in the present invention and a lock-up clutch 27 built in the torque converter 26. This torque converter 26 is given a construction basically similar to that used in the ordinary automatic transmission. Opposed to a pump impeller 29 integrated with a front cover 28 connected to the engine 1, there is arranged a turbine runner 30 which is rotated by the helical flow of a fluid (or oil) as the pump impeller 29 rotates, so that the torque is transmitted in between. Between these pump impeller 29 and turbine runner 30, there is arranged a stator 32 which is supported through a one-way clutch 31 by a stationary shaft integrated with the casing (although both are not shown).

The lock-up clutch 27 is arranged in parallel with the hydraulic power transmission which is composed of those pump impeller 29, turbine runner 30 and stator 32. More specifically, the lock-up clutch 27 is arranged to confront the inner face of the front cover 28 and is mounted on the hub or input shaft (although neither of them is shown) so that it may rotate together with the turbine runner 30. This lock-up clutch 27 transmits, when thrust onto the front cover 28 by the oil pressure, the torque between the front cover 28 and the input shaft. For this torque transmission, a release oil chamber 33 is formed at the side of the front cover 28 across the lock-up clutch 27, and an apply oil chamber 34 is formed at the opposite side (i.e., at the side of the turbine runner 30).

As a result, the lock-up clutch 27 is thrust onto the front cover 28 and is completely applied, when the oil pressure is fed to the apply oil chamber 34 and is discharged from the release oil chamber 33. By then raising the oil pressure in the release oil chamber 33, the pressure (or apply force) to thrust the lock-up clutch 27 onto the front cover 28 is lowered to invite a slip state. By discharging the oil pressure from the apply oil chamber 34 while being fed to the release oil chamber 33, the lock-up clutch 27 is brought away from the front cover 28 into the release state.

As described hereinbefore, the controls of the apply, release and slip states of the lock-up clutch 27 are carried out by the linear solenoid valve SLU. Specifically, reference numeral 35 appearing in FIG. 7 designates a solenoid relay valve, which is constructed to have communication between an input port 36 and an output port 37 when it is fed at its control portion with the oil pressure to be outputted at a predetermined intermediate or higher gear stage (e.g., a third or fourth speed) (i.e., the oil pressure $P_{B2}$ of a frictional engagement element to be applied at that gear stage). Moreover, the input port 36 is connected to the linear solenoid valve SLU, and the output port 37 is connected to a control port 39 of a later-described lock-up relay valve 38.

On the other hand, reference numeral 40 appearing in FIG. 7 designates a lock-up control valve, which is constructed to regulate a line pressure $P_L$ thereby to output a release pressure (i.e., L/U OFF pressure) for releasing the lock-up clutch 27. Specifically, this lock-up control valve 40 is equipped with a spool urged in one direction by a spring, and a first control port 41, as opened in one end of the spool, is given communication with the release oil chamber 33. A second control port 42, as formed adjacent to the first control port 41, is connected with the linear solenoid valve SLU. Opposed to these control ports 41 and 42 across the spool, there is formed a signal pressure port 43, which is connected with the apply oil chamber 34. In accordance with the difference between the oil pressure applied to the control ports 41 and 42 and the oil pressure applied to the signal pressure port 43, the line pressure $P_L$, as fed to an input port 44, is regulated and outputted from an output port 45.

Figure 8:
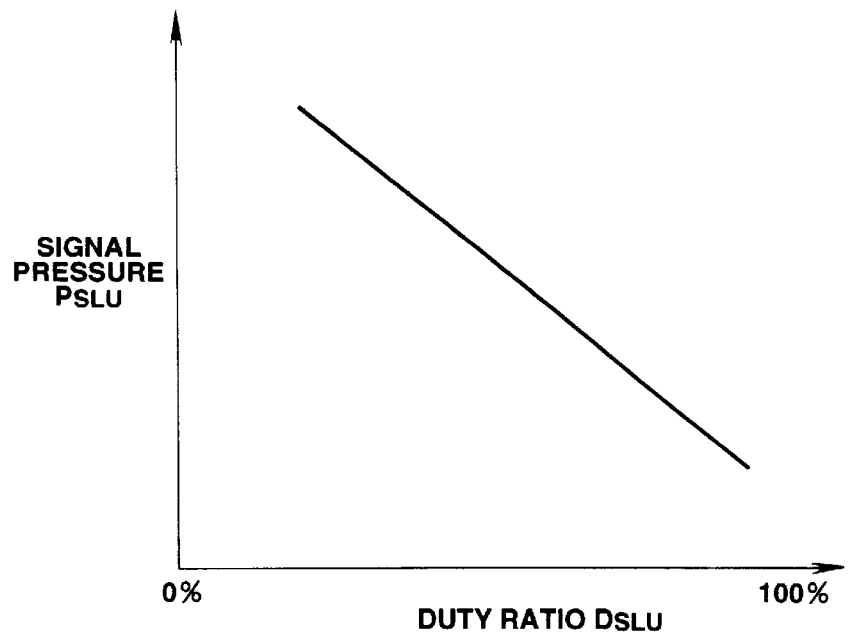
FIG. 8 is a graph plotting a relation between the duty ratio and the output pressure of a linear solenoid valve.

The linear solenoid valve SLU is constructed, as illustrated in FIG. 8, to have an output pressure $P_{SLU}$ gradually lowered as its duty ratio $D_{SLU}$ increases. The lock-up control valve 40 is constructed to have a pressure regulating level raised to have the higher output pressure as the oil pressure to be applied to the second control port 42 is the higher. As a result, the output pressure of the lock-up control valve 40 is controlled to the lower level for the higher duty ratio $D_{SLU}$ of the linear solenoid valve SLU.

Here will be described the lock-up relay valve 38. This lock-up relay valve 38 is the so-called "change-over" valve of spool type for feeding an oil pressure $P_{SM}$, which is modulated by the not-shown secondary modulator valve, selectively to the release oil chamber 33 and the apply oil chamber 34 and for feeding the oil pressure, which is modulated by the lock-up control valve 40, selectively to the release oil chamber 33. The lock-up control valve 40 is fed at its first input port 46 with the secondary modulator pressure $P_{SM}$ and is connected at its second input port 47 with the output port 45 of the lock-up control valve 40. On the other hand, a first output port 48, as given selective communication with the first input port 46, is connected with the apply oil chamber 34, and a second output port 49, as given selective communication with the first and second input ports 46 and 47, is connected with the release oil chamber 33. Moreover, numeral 50 designates a third output port, which is connected with a (not-shown) oil cooler.

Figure 9:
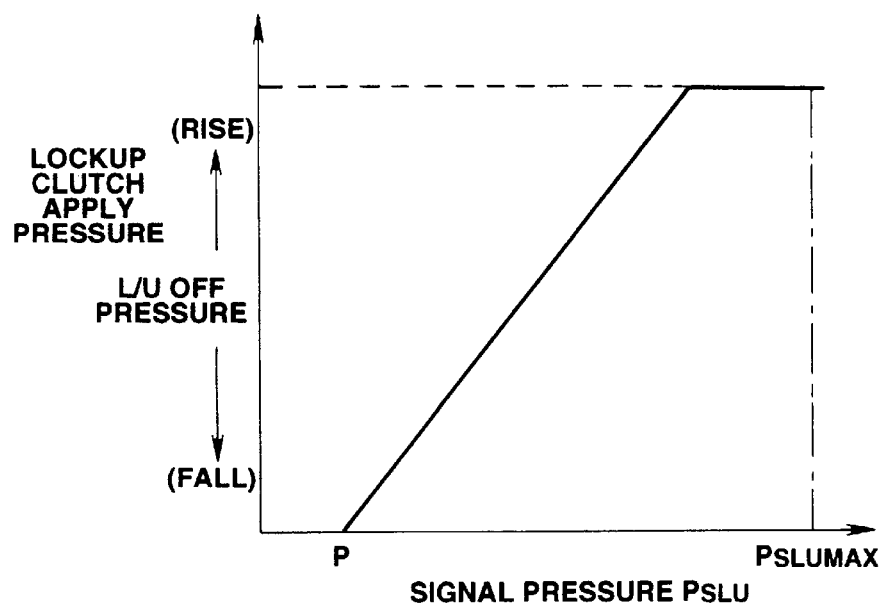
FIG. 9 is a graph plotting a relation between the output pressure of the liner solenoid valve and the apply pressure of the lock-up clutch.

Moreover, the lock-up relay valve 38 is constructed to give, when turned ON by the oil pressure fed to its control port 39 from the solenoid relay valve 35, the first input port 46 the communication with the first output port 48 and the second input port 47 the communication with the second output port 49. In this state, the lockup clutch 27 is applied by the secondary modulator pressure $P_{SM}$ fed to the apply oil chamber 34 thereof, and its apply pressure (or apply force) is properly controlled by the modulated oil pressure acting on the release oil chamber 33. The relation between this apply pressure and the output pressure $P_{SLU}$ of the linear solenoid valve SLU is plotted in FIG. 9.

In the OFF state where no oil pressure is fed to the control port 39, on the other hand, the first output port 48 is opened to communicate with the third output port 50 so that the oil pressure is drained from the apply oil chamber 34, and the second output port 49 is opened to communicate with the first input port 46 so that the secondary modulator pressure $P_{SM}$ is fed to the release oil chamber 33 to bring the lock-up clutch 27 into the release state.

Figure 10:
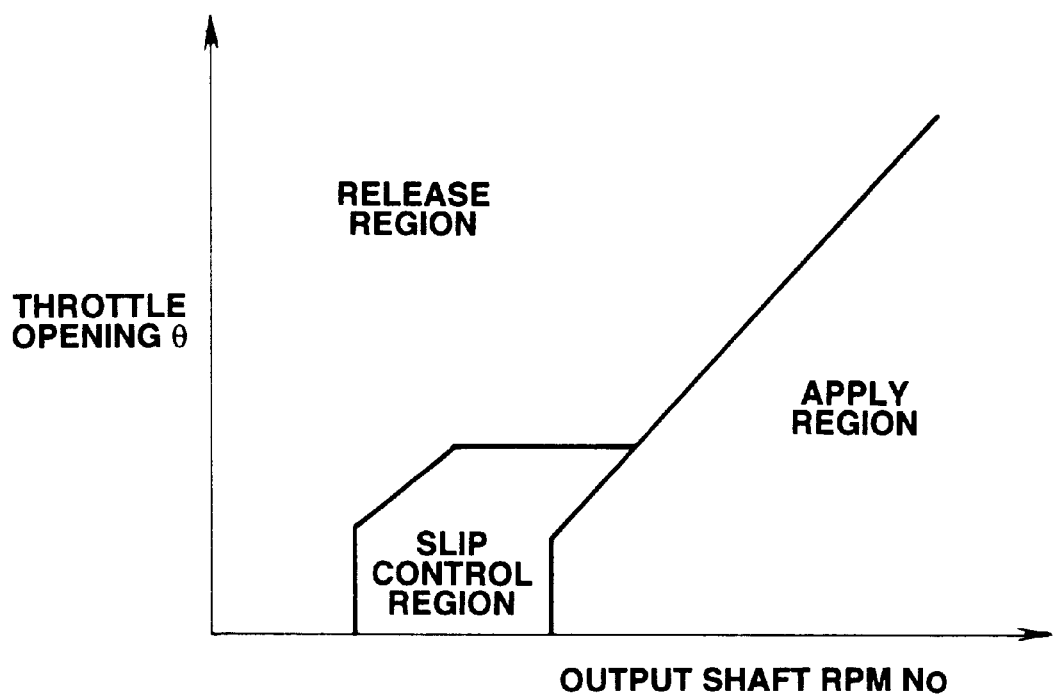
FIG. 10 is a diagram illustrating one example of a map which is set with an apply region, a release region and a slip control region of the lock-up clutch.

The apply, release and slip controls of the lock-up clutch 27 thus set are executed according to the regions which are set by using the vehicle speed (i.e., the output shaft RPM $N_O$) and the opening (i.e., the throttle opening) θ of the main throttle valve 5. More specifically, the controls of the lock-up clutch 27 are executed by prestoring the automatic transmission electronic control unit 21 with a map set with those regions and by determining which region the running state, as decided on the basis of the input data, belongs to. The map, as set with the regions, is exemplified in FIG. 10. In this embodiment, the lock-up clutch 27 is applied or slipped at the forward third and fourth speeds.

Figure 1:
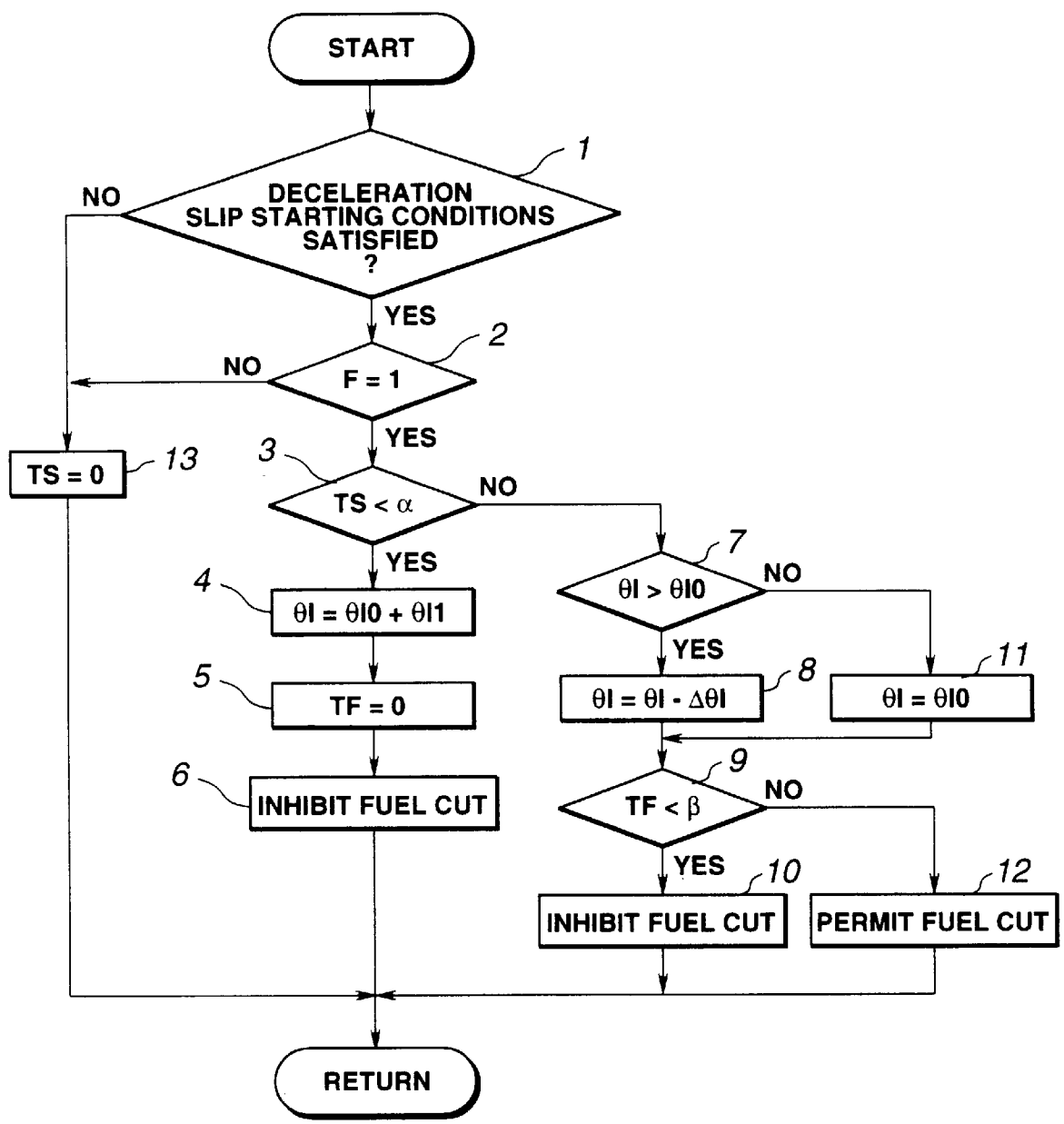
FIG. 1 is a flow chart for explaining a control example for stabilizing an engine output at the beginning of a slip control at a deceleration.

The slip control of the lock-up clutch 27 is executed when the torque is transmitted between the engine 1 and the automatic transmission 2 while being prevented from any abrupt fluctuation. This slip control is executed in parallel with a fuel cut control at a deceleration, for example. FIG. 1 shows one example of the control routine, which is executed at every several tens milliseconds.

In this control routine, it is decided (at Step 1) whether or not the conditions for starting the deceleration slip control are satisfied. A Specifically, these deceleration slip control starting conditions are satisfied by the fact that the throttle opening θ is zero while the vehicle is running with the lock-up clutch 27 being completely applied. In other words, the answer of Step 1 is YES, when the accelerator pedal 4 is released to reduce the throttle opening θ to zero while the vehicle is running with the lock-up clutch 27 being completely applied. Therefore, the function for executing this Step 1 corresponds to deceleration slip deciding means of the present invention.

This slip control at a deceleration (i.e., deceleration slip control) is to raise the oil pressure of the release oil chamber 33 in the lock-up clutch 27 thereby to reduce the difference ΔP from the oil pressure of the apply oil chamber 34, that is, to lower the apply pressure of the lock-up clutch 27 thereby to cause the slip. Specifically, the duty ratio $D_{SLU}$ of the linear solenoid valve SLU is reduced to raise the output pressure $P_{SLU}$ of the same. Simultaneously with this, a timer TS starts to count the time.

When the answer of Step 1 is YES, it is decided (at Step 2) whether or not a flag F is set at "1". This flag F indicates the satisfaction of the condition for allowing the control of the engine output, as will be described hereinafter. When the flag F is set at "1", the condition for the allowance is satisfied. Then, the answer of Step 2 is YES, and the routine advances to Step 3.

At Step 3, it is decided whether or not the counted value of the timer TS, i.e., the elapsed time from the deceleration slip control start is below a reference value α. This timer TS is provided for retaining the time period till the apply pressure of the lock-up clutch 27 reaches the desired level so that the slip control is substantially achieved. For the reference time α, therefore, there is adopted either a constant value experimentally determined in advance or a variable varying with a suitable parameter indicating the running state such as the oil temperature or the vehicle speed. Therefore, the function for executing this Step 3 corresponds to stable state deciding means of the present invention.

At the beginning of the control start, the answer of Step 3 is YES. Then, the opening θ I of the ISC valve 9 is set (at Step 4) to the sum of an opening θ IO for the full closed state of the main throttle valve 5 and a predetermined value θ I1. This predetermined value θ I corresponds to the opening for the suction of an intake air necessary for stabilizing the combustion in the engine 1, and is exemplified by the variable which is adopted, if necessary, from either an experimentally determined constant value or a value varying with a parameter indicating the drive state of the engine 1 such as the engine water temperature or the working condition of the air conditioner. As a result, the air intake for the engine is retained to stabilize the combustion in the engine 1. This control can be executed by driving the ISC valve 9 with the output signal coming from the engine electronic control unit 10. Therefore, the function for executing this Step 4 corresponds to output control means or intake air increasing means of the present invention.

Simultaneously with this, a fuel cut timer TF is cleared (at Step 5), and the fuel cut is inhibited (at Step 6). Specifically, when the throttle opening θ is in the fully closed state and when the vehicle speed is no less than a predetermined reference value, the feed of fuel is interrupted to improve the fuel economy. In the state, however, where the opening of the ISC valve 9 is increased to retain the intake air, the feed of fuel is continued to stabilize the combustion.

On the other hand, when the aforementioned reference time α is elapsed from the start of the slip control so that the answer of Step 3 is NO, it is decided (at Step 7) whether or not the opening θ I of the ISC valve 9 is larger than that θ IO for the full closed state of the main throttle valve 5. The answer of this Step 7 is YES, when the control for increasing the opening of the ISC valve 9 at Step 4 is executed, but is NO when the later-described control for decreasing the opening of the ISC valve 9 gradually is executed.

When the answer of Step 7 is YES, that is, when the predetermined time α is elapsed with the control being made to increase the opening of the ISC valve 9, this opening is reduced (at Step 8) by a predetermined value Δ θ I. This subtracter Δ θ I is at a value for determining the falling gradient of the once increased opening of the ISC valve 9, and is determined considering the fluctuating state of the engine torque and the stable state of the combustion. Therefore, the function for executing this Step 8 corresponds to output restoring means of the present invention. Simultaneously with the start of the control for reducing the opening θ I of the ISC valve 9, the fuel cut timer TF is started.

It is then decided (at Step 9) whether or not the counted value of the fuel cut timer TF is less than a predetermined reference value β. This reference time β is set by estimating the time period for the output shaft torque to stabilize after the opening θ I of the ISC valve 9 restored that for the full closed state. When the counted value of the fuel cut timer TF is less than the reference value β so that the answer of Step 9 is YES, the control for the fuel cut inhibition is continued (at Step 10). In other words, the feed of the fuel is continued.

The aforementioned control of Step 8 is executed each time the answer of Step 7 is YES, so that the opening θ I of the ISC valve 9 is gradually reduced. As a result, when the opening θ I of the ISC valve 9 is reduced to that θ I0 for the full closed state so that the answer of Step 7 is NO, the opening θ I of the ISC valve 9 is set (at Step 11) to that θ I0 for the fully closed state.

When the predetermined time β is elapsed while the opening θ I of the ISC valve 9 being reduced by the predetermined value Δ θ I, or when the predetermined time Δ is elapsed from the start of reducing the opening θ I of the ISC valve 9 after this opening θ I was set to that θ I0 for the full throttle time, the fuel cut is allowed (at Step 12). Here, the fuel cut is executed within a range allowing the continuation of the revolution of the engine 1. When this engine RPM falls to a value less than a predetermined value, the fuel cut is inhibited, and the feed of fuel is started.

On the other hand, when the starting conditions for the deceleration slip control are not satisfied so that the answer of Step 1 is NO, the timer TS is cleared (at Step 13), and this routine is ended.

The controls shown in FIG. 1 will be described with reference to the time chart of FIG. 2. When the main throttle valve 5 is closed so that the conditions for starting the deceleration slip control are satisfied (at an instant to), the output shaft torque begins to fall with the fall in the engine output. With the fall in the line pressure $P_L$ accompanying the decrease in the throttle opening, the oil pressure (i.e., L/U ON pressure) of the apply oil pressure 34 of the lock-up clutch 27 slightly falls. Moreover, the duty ratio of the linear solenoid valve SLU is lowered to bring the lock-up clutch 27 into the slip state. As the signal pressure rises, the oil pressure (i.e., L/U OFF pressure) of the release oil chamber 33 of the lock-up clutch 27 gradually rises. Simultaneously with these controls, the opening θ I of the ISC valve 9 is raised by the predetermined value θ I1.

By these controls, the apply pressure of the lock-up clutch 27 gradually falls, but the apply state is substantially retained at a transient time. In the engine 1, moreover, even when the main throttle valve 5 is fully closed, the ISC valve 9 is opened to keep the suction of intake air so that the combustion in the engine 1 is stabilized to lower the output torque smoothly, as illustrated by broken line in FIG. 2. In this case, the feed of fuel is executed, and the suction of intake air is retained, so that the control of delaying the ignition timing is not executed. As a result, even when the engine 1 and the automatic transmission 2 are substantially in the state where they are mechanically directly connected, the output torque of the engine 1 neither irregularly nor abruptly fluctuates so that the vehicle is kept in its entirety away from shocks or vibrations.

After the oil pressure of the release oil chamber 33 of the lock-up clutch 27 rise to the target level so that the lock-up clutch 27 came into the slip state, the opening θ I of the ISC valve 9 is gradually reduced when the elapsed time from the control start reaches the aforementioned reference time α (at an instant $t_1$). Immediately after the start of this control, the control of delaying the ignition timing is executed to promote the smooth drop of the engine torque. In short, the control of delaying the ignition timing is delayed with the delay in the control of reducing the opening of the ISC valve 9.

After the opening θ I of the ISC valve 9 dropped to that for the full throttle time, the fuel cut is allowed (i.e., the F/C signal ON) when the predetermined time β is elapsed from the start of the reduction in the opening (at an instant $t_2$). Simultaneously with this, the control of delaying the ignition timing is ended, and the duty ratio $D_{SLU}$ of the linear solenoid valve SLU is slightly increased.

Figure 2:
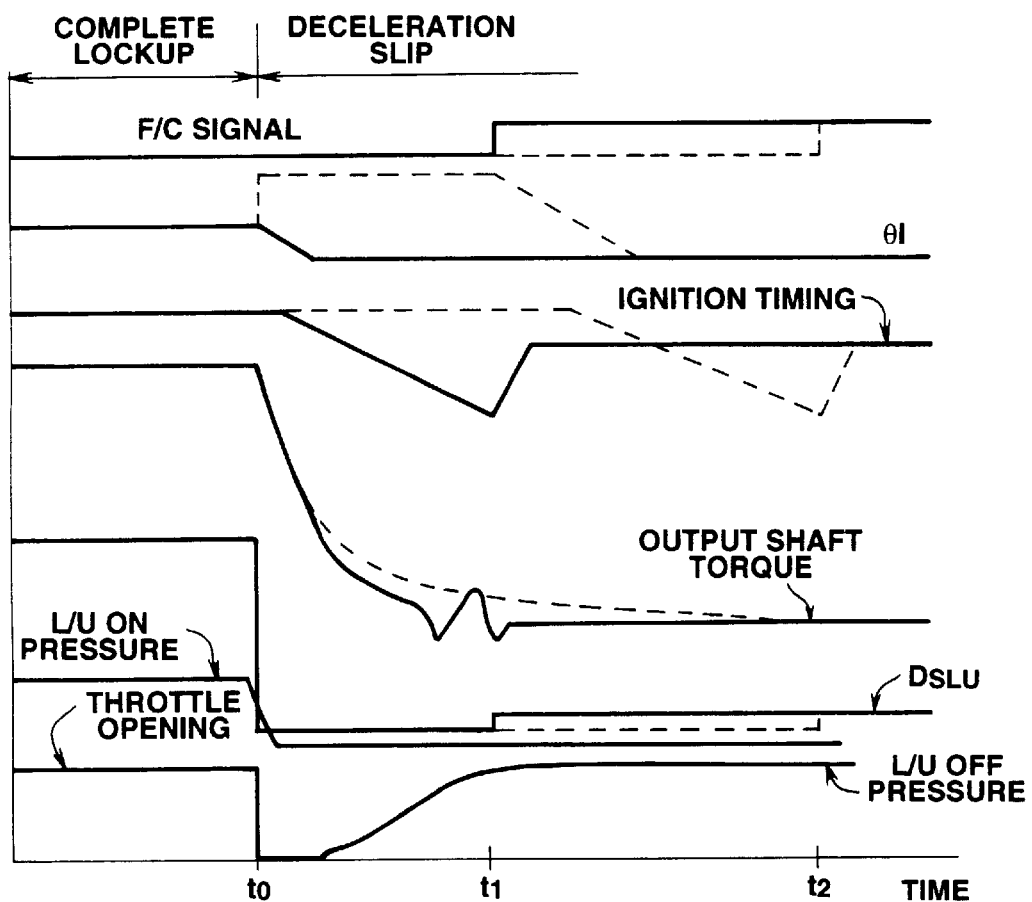
FIG. 2 is a diagram illustrating one example of a time chart for the control shown in FIG. 1.

Contrary to the aforementioned controls illustrated by the broken lines in FIG. 2, the controls by the system of the prior art are illustrated by solid lines in FIG. 2. In the prior art, the torque fluctuations to be caused due to the unstable combustion in the engine 1 by fully closing the throttle opening occur at the transient time period for which the lock-up clutch 27 is controlled into the slip state. The fluctuations appear in the output shaft torque so that they are physically felt.

Figure 3:
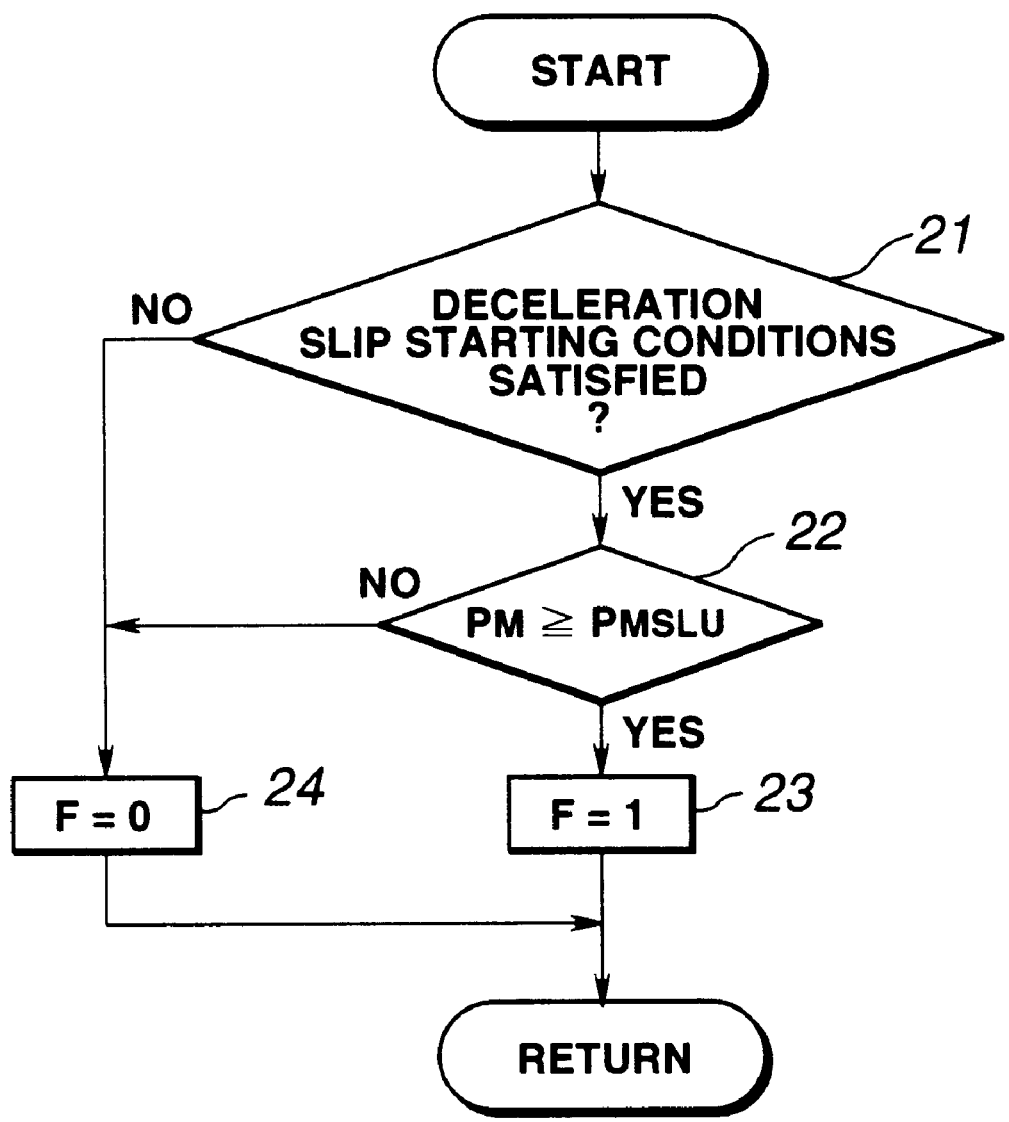
FIG. 3 is a flow chart for explaining a control example for inhibiting the output control of a prime mover at the time of the slip control at the deceleration.

Here will be described the setting of the flag F. This flag F indicates the satisfaction of the conditions for allowing the changing control of the engine output by increasing the opening θ I of the ISC valve 9. This flag F is controlled according to the routine shown in FIG. 3. Specifically, it is decided (at Step 21) whether or not the conditions for starting the deceleration slip control are satisfied. This decision is similar to the aforementioned one of Step 1 of FIG. 1. When the answer of Step 21 is YES, it is decided (at Step 22) whether or not an intake conduit pressure $P_M$ is no lower than a predetermined reference level $P_{MSLU}$.

Since the intake conduit pressure $P_M$ is high at the time of a high load in which the throttle opening is large, the answer YES of Step 22 corresponds to the state where the engine output is high. In this case, therefore, the flag F is set to "1" (at Step 23). When the answer of Step 22 is NO, the flag F is set to "0" (at Step 24). Specifically, the control of changing the output by increasing the opening θ I of the ISC valve 9 at the deceleration slip control is allowed when the engine output is high. When the engine output is low, on the contrary, the control of changing the output by increasing the opening θ I of the ISC valve 9 at the deceleration slip control time is inhibited. As a result, it is possible to prevent in advance the disadvantages that the control of changing the engine output accompanying the deceleration slip control is executed while the vehicle is running with the throttle opening being throttled, and that the engine output is accordingly raised contrary to the will of the driver. Therefore, the reference pressure $P_{MSLU}$ to be adopted is at the level which makes the engine output lower than the level for increasing the opening θ I of the ISC valve 9, as described hereinbefore.

The aforementioned Step 22 is provided in short for deciding the engine output or the engine load. For this decision, the Step 22 may depend upon not only the intake conduit pressure but also another parameter such as the depression stroke of the accelerator pedal or the opening of the main throttle valve 5. Therefore, the function for executing the Step 22 corresponds to low load deciding means in the present invention, and the function for executing the Step 24 corresponds to output change inhibiting means in the present invention.

In the aforementioned control of FIG. 1, the oil pressure of the release oil chamber 33 is raised from substantial zero when the lock-up clutch 27 is to be controlled from the complete lock-up state to the slip state. During the shift to the slip state, therefore, the time period for which the lock-up clutch 27 has an apply pressure at a considerable level is elongated. The shocks or vibrations for this period are prevented by changing the engine output by the ISC valve 9. Here will be described another example of the control for preventing the shocks or vibrations at the time of this full closing state.

Figure 4:
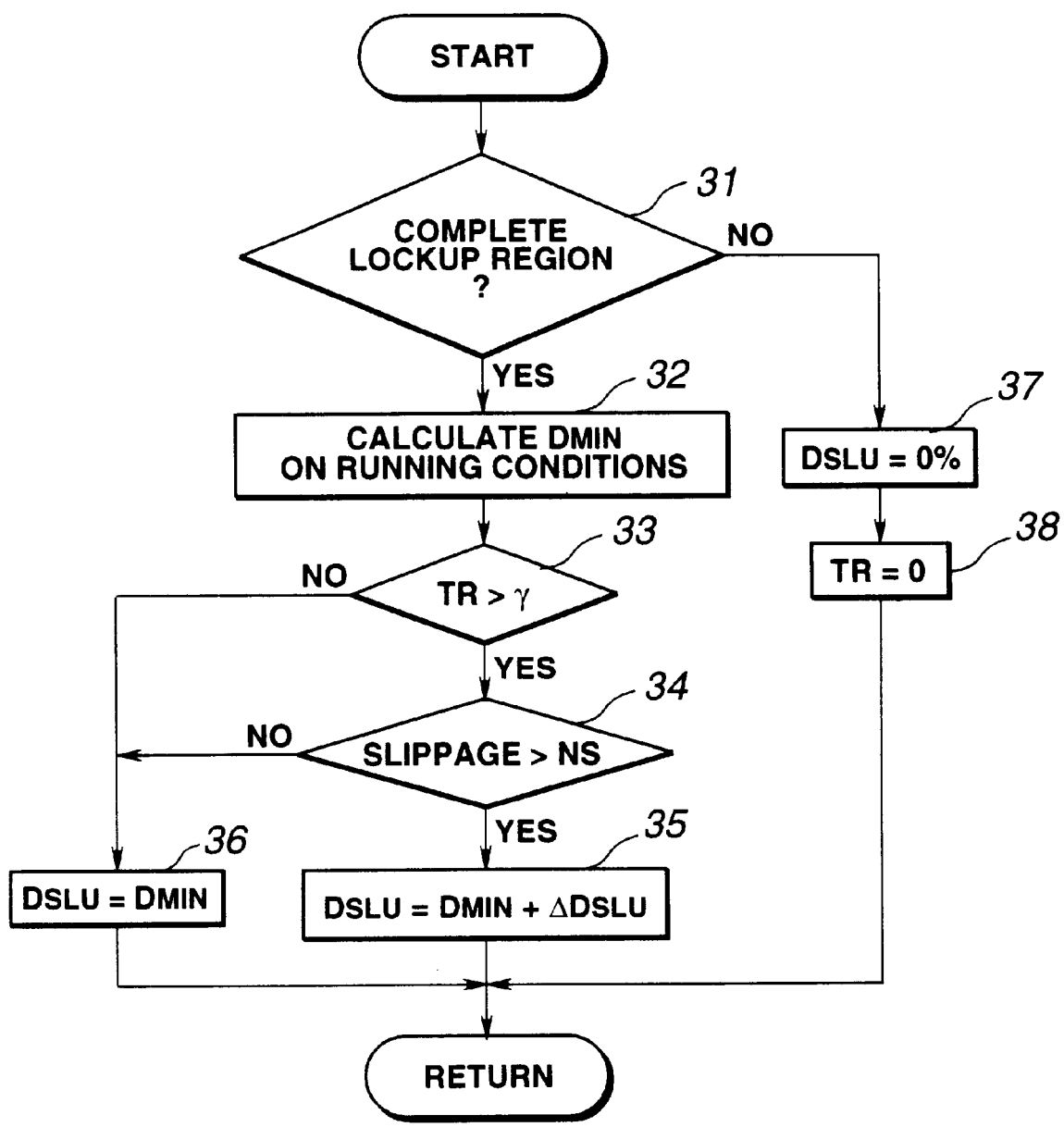
FIG. 4 is a flow chart for explaining a control example for controlling the apply pressure at a complete lock-up time substantially to the minimum level causing no slip.

FIG. 4 shows a flow chart for explaining the control example. First of all, it is decided (at Step 31) whether or not the time chart belongs to the complete lock-up region. Since the individual apply, release and slip states of the lock-up clutch 27 are determined on the basis of the aforementioned map of FIG. 10, the decision of Step 31 can be made on the basis of the map and the detected running state. Alternatively, the decision can also be made on the basis of the feed and discharge states of the oil pressure to and from the lock-up clutch 27 by the hydraulic control unit 20. When the answer of Step 31 is YES, that is, when the running state of the vehicle in the region where the lock-up clutch 27 is controlled in the complete lock-up state for establishing no slip, a minimum duty ratio $D_{MIN}$ is calculated (at Step 32) on the basis of a parameter indicating the vehicular running state such as the vehicle speed or the throttle opening at that time.

It is then decided (at Step 33) whether or not an elapsed time TR, as elapsed from the entry into the complete lock-up region, exceeds a predetermined reference time γ. This reference time γ is preset by estimating the time period which is required for stabilizing the control to bring the lock-up clutch 27 into the complete lock-up state. After lapse of this reference time γ, that is, when the answer of Step 33 is YES, it is decided (at Step 34) whether or not the slippage of the lock-up clutch 27 exceeds a predetermined reference value $N_S$. This slippage of the lock-up clutch 27 can be determined as the difference between the engine RPM and the turbine RPM.

This Step 34 is provided for deciding whether or not the lock-up clutch 27 is outside the complete lock-up state, and its reference value $N_S$ adopts a small value. When the answer of Step 34 is YES, the lock-up clutch 27 is slipping. In this case, therefore, the duty ratio $D_{SLU}$ of the linear solenoid valve SLU is set (at Step 35) to the sum of the aforementioned minimum value $D_{MIN}$ necessary for the complete lockup and a predetermined pressure rise $\Delta D_{SLU}$ (i.e., $D_{DLU} = D_{MIN} + \Delta D_{SLU}$). This control of Step 35 is repeated till the slip of the lock-up clutch 27 disappears, so that the apply pressure of the lock-up clutch 27, i.e., the duty ratio $D_{SLU}$ of the linear solenoid valve SLU is set substantially to the minimum level within the range of no slip in the lock-up clutch 27. Here, the function for executing the Step 32 corresponds to apply force adjusting means in the present invention, and functions for executing the Steps 34 and 35 correspond to learning control means in the present invention.

When the answer of Step 33 is NO because the elapsed time from the entry into the complete lock-up region fails to overcome the aforementioned reference time γ, and when the answer of Step 34 is NO because no slip occurs in the lock-up clutch 27, the minimum value $D_{MIN}$ determined at Step 32 is adopted (at Step 36) as the duty ratio $D_{SLU}$ of the linear solenoid valve SLU.

When the answer of Step 31 is NO because of failure to belong to the complete lock-up region, on the other hand, the duty ratio $D_{SLU}$ is set to 0% (at Step 37). As a result, no oil pressure is applied to the control port 39 of the lock-up relay valve 38, as shown in FIG. 7. This opens the first output port 48 into the third output port 50 so that the oil pressure is discharged from the apply oil chamber 34, and the second output port 49 into the first input port 46 so that the secondary modulator pressure $P_{SM}$ is fed to the release oil chamber 33. As a result, the lock-up clutch 27 is brought into the release state. Simultaneously with this, the timer TR for counting the time period after the complete lock-up region is entered is cleared (at Step 38).

Figure 5:
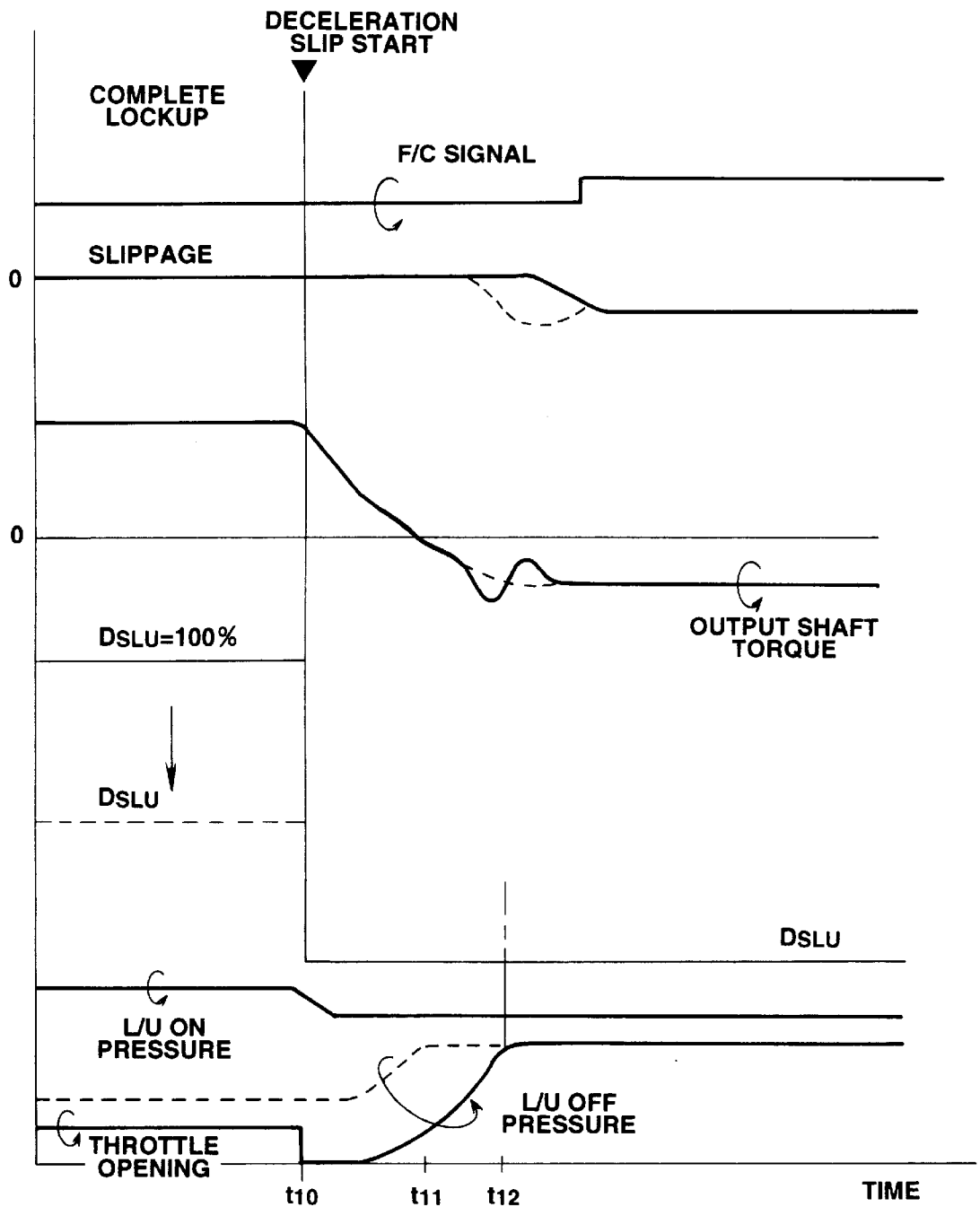
FIG. 5 is a diagram illustrating one example of a time chart for the control shown in FIG. 4.

In FIG. 5, there is shown a time chart of the case in which the accelerator pedal 4 is released to effect the deceleration slip control of the lock-up clutch 27 while the vehicle is running with the apply pressure in the complete lock-up state being set to the minimum level of no slip, as described above.

In the complete lock-up state before the start of the deceleration slip control, as described above, the duty ration $D_{SLU}$ of the linear solenoid valve SLU is lowered so that the oil pressure (i.e., L/U OFF pressure) of the release oil chamber 33 rises to a level causing no slip, as illustrated in FIG. 5. When the main throttle valve 5 is closed in this state to start the deceleration slip control (at an instant $t_{10}$), the duty ration $D_{SLU}$ of the linear solenoid valve SLU is further lowered to raise the oil pressure of the release oil chamber 33 so that the apply pressure of the lock-up clutch 27 falls. In short, the difference in the oil pressure between the apply oil chamber 34 and the release oil chamber 33 decreases.

The oil pressure of the release oil chamber 33 a the time of the deceleration slip control thus executed has already been raised to the considerable level at the complete lock-up time, so that it reaches the target level within a short time period. At this instant $t_{11}$, the engine output is gradually falling. At an instant $t_{12}$, moreover, when the suction of intake air by the engine 1 falls substantially to that in the idling state so that the engine torque transiently but seriously fluctuates. As a result, even if the engine 1 is unstable in combustion to have an abruptly fluctuating output torque, the slippage of the lockup clutch 27 is increased, as illustrated by a broken curve in FIG. 5, so that the torque fluctuation is absorbed. This causes a smooth change in the output shaft torque, as illustrated by a broken curve, so that no shock is physically felt.

In the prior art, on the contrary, the oil pressure of the release oil chamber 33 in the complete lock-up state is set substantially at zero. Then, it takes a long time to raise the oil pressure to the target level for the slip control. At the instant $t_{12}$ when the engine torque fluctuates, the apply pressure of the lock-up clutch 27 is not sufficiently subjected to the slip control so that the fluctuation of the engine torque appears as the output shaft torque to cause the shocks.

Although the present invention has been described in connection with its specific embodiment, it should not be limited thereto. Thus, the construction of the hydraulic circuit for controlling the lock-up clutch 27 may be other than that shown in FIG. 7 and may be made such that the ON/OFF operations of the lock-up clutch 27 are controlled by a third solenoid valve other than the linear solenoid valve. On the other hand, the prime mover in the present invention should not be limited to the internal combustion engine for burning the fossil fuel but may be various ones to be applied to the vehicles, such as an electric motor or a hybrid construction in which the electric motor and the internal combustion engine are combined. Moreover, what is required of the control of changing the output of the prime mover is to suppress the output fluctuation when the output is lowered. Therefore, the aforementioned control of increasing the opening of the ISC valve may be replaced in the prime mover, which is equipped with an electronic throttle valve capable of controlling the opening electrically, by the control of suppressing the output fluctuation by opening the electronic throttle valve.

On the other hand, the hydraulic power transmission, to which is applied the present invention, should not be limited to the torque converter having the torque amplifying action but may be a fluid coupling to function as a mere coupling. Moreover, the decision of the light load state of the prime mover in the present invention may be made on the basis of the data other than the aforementioned intake conduit pressure, such as the stroke of an output control unit such as the accelerator, because the various prime movers can be adopted.

Here will be synthetically described the advantages to be achieved by the present invention. According to the present invention, when the control is made to bring the lock-up clutch from the complete apply state to the slip state in accordance with the operation to lower the output of the prime mover, the flow of intake air to the internal combustion engine as the prime mover is increased to stabilize the output of internal combustion engine. As a result, when the torque transmission capacity of the lock-up clutch is enlarged at the transient time of shift to the slip control of the lock-up clutch by the delay in the control, the input torque to the lock-up clutch can be stabilized to prevent the shocks or vibrations in advance.

According to the present invention, moreover, at the light load time when the vehicle is run with the output of the prime mover being set at a low level, the control of changing the output of the prime mover is inhibited even if the slip control of the lock-up clutch is executed according to the operation to lower the output of the prime mover. As a result, the output of the prime mover is not increased to more than that for the low output run before the start of the slip control. Thus, it is possible to prevent the discomfort of incompatibility which might otherwise be caused by the unintended increase in the drive force.

According to the present invention, moreover, when the lock-up clutch is to be set to the complete lock-up state of no slip, its apply force is set substantially to the minimum level of not slip. At the shift of the lock-up clutch from the complete lock-up state to the slip state, therefore, it can be made with any substantial response delay. As a result, the shocks or vibrations can be prevented in advance even if the output of the prime mover is transiently unstable.

According to the present invention, furthermore, the lock-up clutch can reflect its state upon its apply force. As a result, the aging or individual difference of the lock-up clutch and its control system can be absorbed to set the apply force at the complete lock-up time substantially to the minimum within the range of no slip, thereby to reliably prevent the response delay at the shift to the slip control and the shocks to be caused by the response delay.

What is claimed is:

1. A lock-up clutch slip control system for controlling a lock-up clutch, which is arranged in parallel with a hydraulic power transmission for connecting a prime mover and a speed change unit, selectively into a slip state, comprising:

deceleration slip deciding means for deciding whether or not a slip control of changing said lock-up clutch from a complete apply state to a slip state is to be executed according to the operation of lowering the output of said prime mover; and output control means for changing the output of said prime mover to suppress the output fluctuation of said prime mover when said deceleration slip deciding means decides that the slip control of said lock-up clutch is to be executed.

2. A lock-up clutch slip control system according to claim 1, further comprising:

stable state deciding means for deciding whether or not the slip state of said lock-up clutch is stabilized by executing the slip control which is decided by said deceleration slip deciding means, wherein said output control means changes the output of said prime mover for the time period from the start of said slip control to the decision of the stability of the slip state of said lock-up clutch by said stable state deciding means.

3. A lock-up clutch slip control system according to claim 2, wherein said stable deciding means includes means for deciding the slip state of said lock-up clutch in terms of the lapse of a predetermined time period from the execution of the slip control of said lock-up clutch.

4. A lock-up clutch slip control system according to claim 1, wherein said output control means includes means for increasing the output of said prime mover to a value higher than that which is lowered by said operation.

5. A lock-up clutch slip control system according to claim 1, wherein said prime mover includes an internal combustion engine having an output increased according to the increase in the flow of intake air, and wherein said output control means includes intake air flow increasing means for increasing said intake air flow to more than that at the instant when the output is lowered by said operation.

6. A lock-up clutch slip control system according to claim 5, wherein said intake air flow increasing means includes an idle speed control valve for controlling the idle RPM of said internal combustion engine.

7. A lock-up clutch slip control system according to claim 5, further comprising:

means for inhibiting a fuel cut control for cutting the feed of a fuel to said internal combustion engine, for a predetermined time period after said intake air flow increasing means increased the intake air flow.

8. A lock-up clutch slip control system according to claim 2, further comprising:

output restoring means for restoring the output of said prime mover, which was changed by said output control means, when said stable state deciding means decides that the slip state of said lock-up clutch is stabilized.

9. A lock-up clutch slip control system according to claim 8, wherein said output restoring means includes means for changing the output of said prime mover by predetermined amounts.

10. A lock-up clutch slip control system according to claim 1, further comprising:

light load deciding means for deciding whether or not the load of said prime mover when said deceleration slip deciding means decides that the slip control of said lock-up clutch is to be executed is no more than a predetermined reference value; and output change inhibiting means for inhibiting the control of changing the output of said prime mover by said output control means, when said light load deciding means decides that the load of said prime mover is no more than said predetermined reference value.

11. A lock-up clutch slip control system according to claim 10, wherein said prime mover includes an internal combustion engine having an output increased according to the intake air flow, and wherein said reference value is a predetermined flow of intake air.

* * * * *